(12) United States Patent
Schultz et al.

(10) Patent No.: US 9,108,498 B2
(45) Date of Patent: Aug. 18, 2015

(54) HYDROSTATIC HYDRAULIC HYBRID SYSTEM

(75) Inventors: John C. Schultz, Saline, MI (US); Daryl A. Wilton, Macomb, MI (US)

(73) Assignee: GM GLOBAL TECHNOLOGY OPERATIONS, LLC, Detroit, MI (US)

( * ) Notice: Subject to any disclaimer, the term of this patent is extended or adjusted under 35 U.S.C. 154(b) by 846 days.

(21) Appl. No.: 13/297,223

(22) Filed: Nov. 15, 2011

(65) Prior Publication Data

US 2013/0118159 A1 May 16, 2013

(51) Int. Cl.
*F16D 31/02* (2006.01)
*B60K 6/12* (2006.01)
(52) U.S. Cl.
CPC .............. *B60K 6/12* (2013.01); *B60K 2006/126* (2013.01); *Y02T 10/6208* (2013.01)
(58) Field of Classification Search
CPC .......... F15B 21/14; F15B 2211/20546; F15B 2211/212; F15B 2211/20523; E02F 9/2217; E02F 9/2296; E02F 9/2075; E02F 9/2235; B60K 6/20
USPC ................................... 60/414, 418
See application file for complete search history.

(56) References Cited

U.S. PATENT DOCUMENTS

| 7,273,122 | B2 * | 9/2007 | Rose | 180/165 |
| 7,793,496 | B2 * | 9/2010 | Rampen et al. | 60/414 |
| 8,302,720 | B2 * | 11/2012 | Rose et al. | 180/167 |

FOREIGN PATENT DOCUMENTS

| CN | 1425575 A | 6/2003 |
| CN | 100999184 A | 7/2007 |
| CN | 101068696 A | 11/2007 |
| CN | 101321642 A | 12/2008 |

* cited by examiner

*Primary Examiner* — Edward Look
*Assistant Examiner* — Jason Mikus

(57) ABSTRACT

A hybrid drive system in a vehicle includes a prime mover, a starting device connected to the prime mover, and a transmission having a transmission input shaft connected to the starting device. A pump/motor is functionally interconnected between the starting device and the transmission. A first accumulator is in fluid communication with the motor/pump for storing a hydraulic fluid under pressure and a second accumulator is in fluid communication with the pump/motor for storing hydraulic fluid discharged from the first accumulator. Discharge of the first accumulator drives the pump/motor to provide a drive torque to the transmission input shaft and to provide a drive torque to the prime mover for starting the prime mover.

14 Claims, 1 Drawing Sheet

HYDROSTATIC HYDRAULIC HYBRID SYSTEM

FIELD

Figure 1:
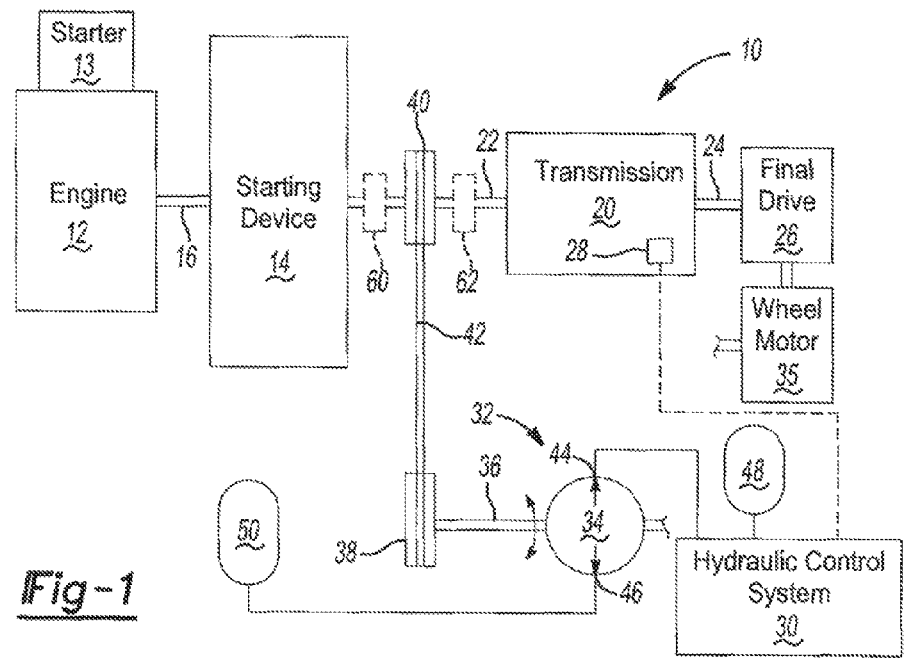

The present disclosure relates to a hydrostatic hydraulic hybrid drive system for a motor vehicle and more particularly to a hydrostatic hybrid system disposed at an input of an automatic transmission to multiply torque during launch and to allow engine stop-start and regenerative braking.

BACKGROUND

The statements in this section merely provide background information related to the present disclosure and may or may not constitute prior art.

Hybrid powertrains for motor vehicles employ two or more distinct power sources to propel the motor vehicle. In a hydraulic hybrid vehicle (HHV) a regular internal combustion engine and a hydraulic motor are used to power the motor vehicle. Hydraulic hybrid systems typically include two components: high pressure hydraulic fluid vessels or accumulators and hydraulic drive pump/motors. The accumulators are used to store pressurized fluid. Acting as a motor, the hydraulic drive uses the pressurized fluid to rotate the wheels of the motor vehicle. Acting as a pump, the hydraulic drive is used to re-pressurize hydraulic fluid by using the momentum of the vehicle. This process converts kinetic energy into reusable potential energy and is called regenerative braking. There are two types of HHVs: parallel and series. In parallel HHVs both the engine and the hydraulic drive system mechanically interact with the wheels. The hydraulic pump/motor is often integrated into the differential or final drive unit.

While these systems are effective, there is room in the art for a hydraulic hybrid system having reduced complexity and energy costs while still providing adequate engine stop-start performance and vehicle launch performance that can be packaged in on road vehicles including passenger cars, SUV's, and pick-up trucks.

SUMMARY

In one example of the principles of the present invention, a hybrid drive system for a motor vehicle is provided. The hybrid drive system includes a prime mover, a starting device connected to the prime mover, and a transmission having a transmission input shaft connected to the starting device. A pump/motor is functionally interconnected between the starting device and the transmission. A first accumulator is in fluid communication with the motor/pump for storing a hydraulic fluid under pressure and a second accumulator is in fluid communication with the pump/motor for storing hydraulic fluid discharged from the first accumulator. Discharge of the first accumulator drives the pump/motor to provide a drive torque to the transmission input shaft and to provide a drive torque to the prime mover for starting the prime mover. Rotation of the transmission input shaft during coastdown drives the pump/motor to pump hydraulic fluid from the second accumulator to the first accumulator to charge the first accumulator and regeratively brake the vehicle.

In one aspect of the present invention the pump/motor is disposed on-axis with the transmission input shaft.

In another aspect of the present invention the pump/motor is disposed off-axis relative to the transmission input shaft.

In another aspect of the present invention a first gear is disposed on and is coaxial with the transmission input shaft, a second gear is connected for rotation with a rotor of the pump/motor, and a drive chain is connected to the first and second gears to rotationally couple the first gear with the second gear.

In another aspect of the present invention an axis of rotation of the rotor of the pump/motor is radially offset from and parallel with the transmission input shaft.

In another aspect of the present invention the prime mover is a combustion engine.

In another aspect of the present invention the first accumulator has a higher charge pressure than the second accumulator.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
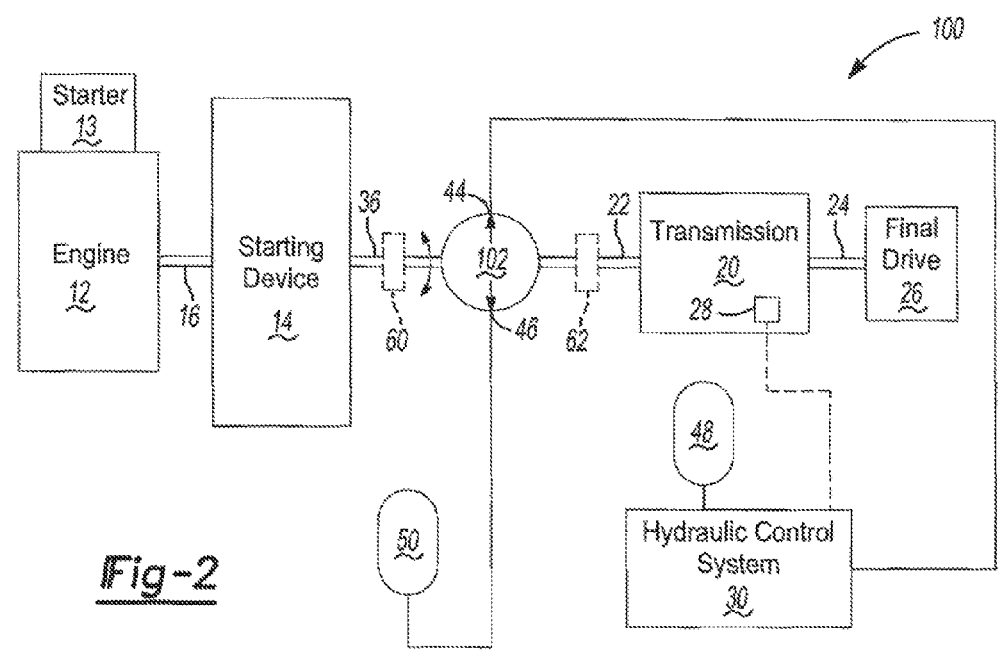

FIG. 1 is a schematic view of a powertrain of a motor vehicle according to the principles of the present invention; and FIG. 2 is another schematic view of a powertrain of a motor vehicle according to the principles of the present invention.

DETAILED DESCRIPTION

The following description is merely exemplary in nature and is not intended to limit the present disclosure, application, or uses.

With reference to FIG. 1, an exemplary powertrain for a motor vehicle is generally indicated by reference number 10. The powertrain 10 includes an engine 12 for providing power and torque to propel the motor vehicle. The engine 12 may be a conventional internal combustion engine or an electric motor, or any other type of prime mover, without departing from the scope of the present disclosure. An electric engine starter 13 is connected to the engine 12 to start the engine 12. The engine 12 is configured to provide driving torque to a starting device 14 through an engine output shaft 16. The engine output shaft 16 may be connected to the starting device 14 through a flexplate (not shown) or other connecting device. The starting device 14 may be a hydrodynamic device, such as a fluid coupling or torque converter, an electric motor, or a friction device such as a dry or wet launch clutch or dual clutch. It should be appreciated that any type of starting device 14 may be employed without departing from the scope of the present disclosure.

The transmission 20 may be a front wheel drive transmission or a rear wheel drive transmission. Generally speaking, the transmission 20 includes a transmission input shaft 22 and a transmission output shaft 24. The transmission input shaft 22 is functionally interconnected with the engine 12 via the starting device 14 and receives input torque or power from the engine 12. Accordingly, the transmission input shaft 22 may be a turbine shaft in the case where the starting device 14 is a hydrodynamic device, dual input shafts where the starting device 14 is dual clutch, or a drive shaft where the starting device 14 is an electric motor. Disposed between the transmission input shaft 22 and the transmission output shaft 24 is a gear and clutch arrangement (not shown). The gear and clutch arrangement may include a plurality of gear sets, a plurality of clutches and/or brakes, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The clutches/brakes are selectively engageable to initiate at least one of a plurality of gear or speed ratios by selectively coupling individual gears within the plurality of gear sets to the plurality of shafts. It should be appreciated that the specific arrangement and number of the gear sets, clutches/brakes, and shafts within the transmission 20 may vary without departing from the scope of the present disclosure.

The transmission output shaft 22 is preferably connected with a final drive unit 26. The final drive unit 26 may include, for example, propshafts, differential assemblies, and drive axles.

The transmission 20 also includes a transmission control module 28. The transmission control module 28 is preferably an electronic control device having a preprogrammed digital computer or processor, control logic, memory used to store data, and at least one I/O peripheral. The control logic includes a plurality of logic routines for monitoring, manipulating, and generating data. The transmission control module 28 controls the actuation of the transmission 20 via a hydraulic control system 30. The hydraulic control system 30 is operable to selectively engage clutches/brakes by selectively communicating a hydraulic fluid to hydraulic actuators that mechanically engage the clutches/brakes. The hydraulic fluid is communicated to the clutches/brakes under pressure from a hydrostatic pump/motor system 32 connected to the hydraulic control system 30, as will be described in greater detail below.

The hydrostatic pump/motor system 32 is configured to provide pressurized hydraulic fluid to the hydraulic control system 30 and to provide power to the final drive unit 26 through the transmission 20. Accordingly, the power provided by the hydrostatic pump/motor system 32 leverages the torque multiplication of the transmission 20. The hydrostatic pump/motor system 32 may provide power to the final drive unit 26 either alone or with power provided by the engine 12 and starting device 14. For example, in one embodiment of the present invention, the hydrostatic pump/motor system 32 includes an off-axis hydrostatic pump/motor 34. The hydrostatic pump/motor 34 may be any type of fixed or variable displacement bi-directional pump/motor unit capable of acting as a motor for producing a drive torque and as a pump for providing pressurized fluid, depending on the direction of rotation. Examples of the hydrostatic pump/motor 34 include an axial piston pump for use with high pressure hydraulic fluid (e.g., approximately 5000 psi) and rotary pumps including vane and gear pumps for use with relatively lower pressure hydraulic fluid (e.g., approximately 500 psi). The hydrostatic pump/motor 34 is mechanically connected with a rotor shaft 36. A first gear 38 is connected to the rotor shaft 36 while a second gear 40 is connected to the transmission input shaft 22 between the starting device 14 and the transmission 20. A drive chain 42 rotationally couples the first gear 38 with the second gear 40. In an alternate embodiment, the drive chain 42 is replaced by one or more intermeshing gears that mesh with the first gear 38 with the second gear 40.

The hydrostatic pump/motor 34 includes a first fluid port 44 and a second fluid port 46. The first fluid port 44 is in fluid communication with the hydraulic control system 30 and a high pressure accumulator 48. The second fluid port 46 is in fluid communication with a low pressure accumulator or other closed reservoir 50. The hydraulic control system 30 and the hydrostatic pump/motor system 32 form a closed hydraulic circuit.

The hydrostatic pump/motor system 32 is operable to act in parallel with the starting device 14 to provide additional power to the transmission to launch the motor vehicle. To provide additional power, the high pressure accumulator 48 is discharged (for example, by opening a valve or solenoid). The high pressure fluid communicates to the fluid port 44 and drives the hydrostatic pump/motor 34, providing power to the rotor shaft 36, through the gears 38 and 40 and the drive chain 42 to the transmission input shaft 22. The hydraulic fluid, now at low pressure, exits the hydrostatic pump/motor 32 from the fluid port 46 and is communicated to the low pressure accumulator 50.

The hydrostatic pump/motor system 32 is re-pressurized by the engine 12 or using regenerative braking whereby kinetic energy is recovered from the transmission input shaft 22 during coastdown or braking of the motor vehicle. For example, rotation of the transmission input shaft 22 rotatingly drives the gears 38 and 40 and the drive chain 42, thereby providing rotational power to the rotor shaft 36. Rotation of the rotor shaft 36 in turn drives the hydrostatic pump/motor 34. Hydraulic fluid is drawn from the low pressure accumulator 50 through fluid port 46 and communicated to the high pressure accumulator 48 via fluid port 44. The rotational power of the hydrostatic pump/motor 34 is sufficient to charge the high pressure accumulator 48. Larger accumulators may be packaged to enable greater duty cycle. In addition, a separate electric driven pump (not shown) may be included to charge the accumulators 48 and 50 if necessitated by hydraulic fluid leakage.

In various configurations it is desirable to allow independent motion between the engine 12 and the transmission 20. Where the starting device 14 is a hydrodynamic starting device such as a torque converter, the starting device 14 naturally allows relative rotational motion between the engine 12 and transmission 20. This allows the engine 12 to run while the vehicle is stationary and can allow a pump/motor to propel the vehicle to creep with the engine 12 turned off, as will be described below. Where the starting device 14 is a mechanical device, optional disconnect clutches, illustrated with dashed lines and indicated by reference numbers 60 and 62, may be used in the powertrain 10 to implement engine restart and/or vehicle creep. For example, the disconnect clutch 60 is connected between the starting device 14 and the pump/motor system 32 and the disconnect clutch 62 is connected between the pump/motor system 32 and the transmission 20. The disconnect clutch 60 enables the pump/motor 34 to propel the vehicle to creep with the engine 12 turned off where the starting device 14 is a mechanical device. The disconnect clutch 62 enables restarting the engine 12 using the pump/motor 34 while the vehicle is stationary where the starting device 14 is a mechanical device. It should be appreciated that the powertrain 10 may include either one or both of the disconnect clutches 60 and 62.

The hydrostatic pump/motor 34 may also be connected to a wheel motor 35 disposed in parallel with the transmission 20. This separate parallel power path is typically called a "power split" transmission. This arrangement can be advantageous since the mechanical transmission gearbox can be made smaller if it does not need to handle full power to satisfy vehicle peak torque operating conditions, such as vehicle launch. Using stored hydrostatic energy may also help downsize the engine for extra fuel economy improvement. The wheel motor 35 may be directly coupled to the final drive unit 26 or to the wheels of the motor vehicle to enable hydraulic "All Wheel Drive" (AWD). This allows a compact front wheel drive transmission gearbox driving the front wheels for improved highway fuel economy while the hydraulic AWD provides power to the rear wheels for improved traction as needed per driving conditions.

During operation of the powertrain 10, the motor vehicle will occasionally enter engine stop-start conditions. Engine stop-start occurs when the motor vehicle has temporarily stopped during operation, such as at a traffic light, stop sign, or due to traffic or other temporary conditions. During an engine stop-start, the engine 12 shuts down to increase fuel economy. However, it is important that the clutches/brakes within the transmission 20 remain primed (i.e. hydraulically actuated to an engaged position) with low pressure hydraulic fluid in order to allow swift and noiseless gear engagement when the engine 12 starts. Accordingly, during a stop-start, when the engine 12 is off, the high pressure accumulator 48 or the low pressure accumulator 50 may be discharged in order to keep the clutch circuits filled with pressurized hydraulic fluid. In addition, discharge of the high pressure accumulator 48 provides drive torque to the transmission 20 allowing the powertrain 10 to provide motive power to the motor vehicle to allow low speed movement or "creep" during engine stop. Fuel economy is gained by avoiding engine idle fuel consumption. Finally, the discharge of the high pressure accumulator 48 can be used to restart the engine 12 during an engine stop by providing drive torque to the engine 12. This eliminates the need to use the electric starter 13 during engine restart, thereby saving energy.

The construction and configuration of the hydrostatic pump/motor system 32 provides high pumping efficiency by mounting the hydrostatic pump/motor 34 off-axis in a transmission. The overall smaller pump diameter and component size of an off-axis pump reduces rotational and sliding friction, reduces rotating internal leakage and permits tighter tolerances, all factors which improve operating efficiency. In addition, an off-axis design facilitates other drive arrangements such as by a dedicated electric motor which has the additional capability of driving the pump when the engine is not running in, for example, engine start-stop applications.

Turning to FIG. 2, an alternate powertrain is generally indicated by reference number 100. The powertrain 100 is similar to the powertrain 10 shown in FIG. 1 and like components are indicated by like reference numbers. The powertrain 100 includes an on-axis hydrostatic pump/motor 102. The hydrostatic pump/motor 102 is directly mechanically coupled to the transmission input shaft 22 between the starting device 14 and the transmission 20. The hydrostatic pump/motor 102 may be any type of fixed or variable displacement bi-directional pump/motor unit capable of acting as a motor for producing a drive torque and as a pump for providing pressurized fluid, depending on the direction of rotation. For example, the hydrostatic pump/motor 102 may be a radial piston pump. The on-axis hydrostatic pump/motor 102 may provide advantageous packaging options to the motor vehicle 10.

The description of the invention is merely exemplary in nature and variations that do not depart from the gist of the invention are intended to be within the scope of the invention. Such variations are not to be regarded as a departure from the spirit and scope of the invention.

The following is claimed:

1. A drive system in a vehicle, the drive system comprising:
a prime mover;
a starting device connected to the prime mover;
a transmission having a transmission input shaft connected to the starting device;
a pump/motor connected between the starting device and the transmission;
a first clutch connected between the pump/motor and the starting device for selectively coupling the starting device to the pump/motor;
a second clutch connected between the pump/motor and the transmission input shaft for selectively coupling the pump/motor to the transmission input shaft;
a first accumulator in fluid communication with the motor/pump for storing a hydraulic fluid under pressure; and
a second accumulator in fluid communication with the pump/motor, and
wherein discharge of the first accumulator drives the pump/motor to provide a drive torque to the transmission input shaft and to provide a drive torque to the prime mover for starting the prime mover.

2. The drive system of claim 1 wherein the pump/motor is disposed on-axis with the transmission input shaft.

3. The drive system of claim 1 wherein the pump/motor is disposed off-axis relative to the transmission input shaft.

4. The drive system of claim 3 further comprising a first gear disposed on and coaxial with the transmission input shaft, a second gear connected for rotation with a rotor of the pump/motor, and a drive chain connected to the first and second gears to rotationally couple the first gear with the second gear.

5. The drive system of claim 4 wherein an axis of rotation of the rotor of the pump/motor is radially offset from and parallel with the transmission input shaft.

6. The device of claim 1 wherein the prime mover is a combustion engine.

7. The device of claim 1 wherein the first accumulator has a higher charge pressure than the second accumulator.

8. The device of claim 1 wherein rotation of the transmission input shaft drives the pump/motor to pump hydraulic fluid from the second accumulator to the first accumulator to charge the first accumulator.

9. A drive system in a vehicle, the drive system comprising:
a prime mover having an output shaft;
a starting device coupled to the output shaft of the prime mover;
a transmission having a transmission input shaft connected to the starting device;
a bi-directional pump having a rotor functionally interconnected to the transmission input shaft between the starting device and the transmission, the bi-directional pump having a first fluid port and a second fluid port;
a first clutch connected between the bi-directional pump and the starting device for selectively coupling the starting device to the bi-directional pump;
a second clutch connected between the bi-directional pump and the transmission for selectively coupling the pump/motor to the transmission, wherein the first clutch and the second clutch are coaxial;
a hydraulic control system operatively associated with the transmission and in fluid communication with the first fluid port of the bi-directional pump;
a high pressure accumulator for storing a hydraulic fluid under pressure, the high pressure accumulator in fluid communication with the first fluid port of the bi-directional pump via the hydraulic control system; and
a low pressure accumulator in fluid communication with the second fluid port of the bi-directional pump, and
wherein discharge of the high pressure accumulator drives the rotor of the bi-directional pump to provide a drive torque to the transmission input shaft and wherein rotation of the transmission input shaft drives the rotor of the bi-directional pump to pump the hydraulic fluid from the low pressure accumulator to the high pressure accumulator to charge the high pressure accumulator and to regeneratively brake the vehicle.

10. The drive system of claim 9 wherein the rotor of the bi-directional pump is coaxial with the transmission input shaft.

11. The drive system of claim 9 wherein the bi-directional pump is disposed off-axis relative to the transmission input shaft.

12. The drive system of claim 11 further comprising a first gear disposed on and coaxial with the transmission input shaft, a second gear connected for rotation with the rotor of the bi-directional pump, and a drive chain connected to the first and second gears to rotationally couple the first gear with the second gear.

13. The drive system of claim 12 wherein an axis of rotation of the rotor of the bi-directional pump is radially offset from and parallel with the transmission input shaft.

14. The device of claim 9 wherein the prime mover is a combustion engine.

\* \* \* \* \*